United States Patent [19]

Gibbs

[11] 4,273,053
[45] Jun. 16, 1981

[54] MATERIAL HANDLING APPARATUS

[75] Inventor: James W. Gibbs, Hialeah, Fla.

[73] Assignee: Gibbs-Ryder Materials Handling Systems, Inc., Coral Gables, Fla.

[21] Appl. No.: 671,729

[22] Filed: Mar. 29, 1976

[51] Int. Cl.³ .......................................... B61B 13/12
[52] U.S. Cl. .................................... 104/168; 104/48; 104/88; 104/130; 104/165; 105/177; 198/472; 198/722; 414/236
[58] Field of Search ................... 104/48, 88, 130, 135, 104/147 R, 165, 166, 168, 249, 250; 105/177; 214/16.1 CC, 16.1 CD, 16.1 CE; 193/35 MD, 35 R; 198/472, 722, 782, 787; 414/236, 239

[56] References Cited

U.S. PATENT DOCUMENTS

| | | | |
|---|---|---|---|
| 1,550,754 | 8/1925 | Sockman | 104/249 X |
| 1,676,011 | 7/1928 | Evans | 198/782 X |
| 3,137,244 | 6/1964 | Holley et al. | 105/177 X |
| 3,217,905 | 11/1965 | Frangos | 214/16.1 CE |
| 3,447,665 | 6/1969 | Egeland et al. | 198/782 |
| 3,530,800 | 9/1970 | Watkins | 104/168 |
| 3,565,233 | 2/1971 | Hinman | 198/782 |
| 3,738,284 | 6/1973 | Atsuta et al. | 105/177 |
| 3,964,588 | 6/1976 | Kornylak | 193/35 MD X |
| 3,978,975 | 9/1976 | Herbes et al. | 198/782 |

Primary Examiner—Randolph A. Reese
Attorney, Agent, or Firm—Hamilton, Renner & Kenner

[57] ABSTRACT

Transporter or material handling apparatus for the controlled movement of goods includes two pairs of intersecting rails, a pallet for supporting the goods, a first group of wheels mounted on the pallet for rolling on one pair of intersecting rails, a second group of wheels mounted on the pallet for rolling on the other pair of intersecting rails, and a directional interchange in each of the intersecting rails permitting movement of the pallet in two angularly disposed directions therefrom. The movement of the pallet may be effected by a drive which engages the pallet for selectively propelling it in either of the two directions.

12 Claims, 9 Drawing Figures

MATERIAL HANDLING APPARATUS

BACKGROUND OF THE INVENTION

In general the invention relates to transporter apparatus adaptable for automated warehousing or other storage of various types of goods. More particularly, the invention relates to transporter apparatus for effecting rapid storage and retrieval of various types of goods during transportation or for temporary or extended storage purposes. More specifically, the invention relates to a palletized material handling or transporter system which is adaptable to a plurality of levels, which permits a high ratio of storage space per unit of building space and which is otherwise advantageous for purposes of expeditious storage and retrieval of large numbers of palletized units.

Historically, storage or warehousing of goods or containers of goods has been effected on multilevel arrangements of shelves having limited depth and a great number of intermittent aisles for purposes of effecting reasonable accessibility for placement and retrieval of stored goods. For purposes of handling articles of goods of substantial weight, aisles of excessive width normally have been required for the purpose of permitting passage of heavy equipment of the type required for the transportation and placement of the goods. The end result of such systems is that a relatively small percent of a given size building or enclosure is usable as actual storage capacity.

More recently, efforts have been made to effect improvements in the storage density in a building or enclosure. In this respect, there has been a proliferation of what are termed stacker crane type units wherein a loading and unloading device is movable via a track or other means of controlled motion to afford transportation and loading and unloading from a plurality of storage spaces. These units are commonly capable of three dimensional positioning and are frequently automated for remote controlled operation. Although effecting some economies in space utilization, these units nevertheless generally require minimal depth rack configurations with frequently interspersed open aisles for purposes of accessibility for storage and retrieval of goods. This combined with the necessary sophistication of a crane unit produces little overall cost advantage in comparison with conventional storage facilities which have been employed for many years.

Another approach which has gained some consideration involves the use of a plurality of movable pallets which are positioned in close horizontal proximity such that higher density storage is possible. In installations of this nature the pallets are normally movable in one or more directions to one or more service positions whereby an elevator or other device may be employed for retrieval of a particular pallet. Although affording vastly superior economies in terms of storage space per unit of building or enclosure space, these units have in general enjoyed less than wide commercial acceptance. A primary problem encountered in conjunction with such systems is the expense produced by the necessity for a great proliferation of the apparatus required to effect movement of the individual pallets in two or more directions. In order to effect optimum space utilization, movement in perpendicular directions to shift the pallets to different positions is normally an absolute requirement. In addition, drive mechanisms are normally proposed for each of the individual pallets with these mechanisms duplicated in many instances to effect independent drive in the two perpendicular directions. As a result of the duplication and proliferation of parts necessary to accomplish the requisite movements and driving force therefor, most such systems are characterized by substantial expense.

In addition to the above features, the prior art systems devised to provide movement in two perpendicular directions normally employ wheels oriented in perpendicular directions. In order to provide unimpeded motion in the two directions the prior art has commonly resorted to the use of two different sets of wheels arranged on different vertical levels to engage intersecting multilevel tracks or rails. In other instances, efforts have been made to make at least one set of wheels vertically or pivotally movable such that they may be selectively brought into engagement or disengagement with intersecting rails when travel in one of two perpendicular directions is desired with a fixed set of wheels providing travel in the other direction. Either of these approaches presents certain problems, the former resulting in a lack of versatility and the latter in the use of numerous heavy-duty moving parts to effect the requisite vertical motion of pallets which are laden with extreme loads. As a result of these and other deficiencies, none of the known prior art devices have achieved anything even approaching universal acceptance.

SUMMARY OF THE INVENTION

It is an object of the present invention to provide transporter or material handling apparatus which is readily adaptable for effecting the storage and retrieval of a variety of types of goods of substantially differing sizes, shapes and weights. Another object of the invention is to provide such apparatus with the potential capability of providing relatively rapid storage and retrieval times for a given number of pallets in comparison with known systems. A further object of the invention is to provide such apparatus wherein particularly the movable pallets are of extremely noncomplex construction for purposes of withstanding operating and environmental abuse and for purposes of operating in conjunction with or incorporating auxiliary equipment for handling or controlling the environment of the goods.

Another object of the invention is to provide such apparatus which inherently allows a high utilization ratio of storage space to building space in both a floor area and volumetric sense. A further object of the invention is to provide such apparatus which readily lends itself to modular construction techniques which greatly facilitate prefabrication, erection, expansion and disassembly of a configuration embodying the present invention. Still another object of the invention is to provide such apparatus for incorporation in a configuration which provides a high degree of flexibility with respect to the type of control system employed to effect the movement of pallets to store and retrieve the goods.

Still a further object of the invention is to provide apparatus wherein a system of interlocks associated with the track system on which the pallets move effects horizontal and vertical locking isolation of each individual pallet, except during travel between adjacent positions. Yet another object of the invention is to provide a drive system for pallets which is attached to the structural framework to maintain the pallets under positive control during travel within the system. A further object of the invention is to provide apparatus which permits pallet movements to adjacent positions on a common level, without the necessity for vertical displacement of the pallets or any components thereof.

Still another object of the invention is to provide apparatus which can employ relatively inexpensive components which are duplicative to a substantial extent such that construction costs may be minimized. Yet a further object of the invention is to provide such apparatus inherently permitting design characteristics compatible with a long service life and relatively maintenance-free operation.

These and other objects, together with the advantages thereof over existing and prior art forms which will become apparent from the following specification, are accomplished by the means hereinafter described and claimed.

In general, transporter or material handling apparatus for the controlled movement of various types of goods according to the concepts of the present invention includes at least two pairs of intersecting rails, at least one pallet capable of supporting the goods, a first group of wheels mounted on the pallet for rolling on one of the pairs of intersecting rails, a second group of wheels mounted on the pallet for rolling on another of the pairs of intersecting rails and an interchange in each of the rails permitting movement of the first and second groups of wheels in two angular directions therefrom; the first group of wheels rollably supporting the pallet upon movement in one direction and the second group of wheels rollably supporting the pallet upon movement in the other direction.

DESCRIPTION OF THE PREFERRED EMBODIMENT

Figure 1:
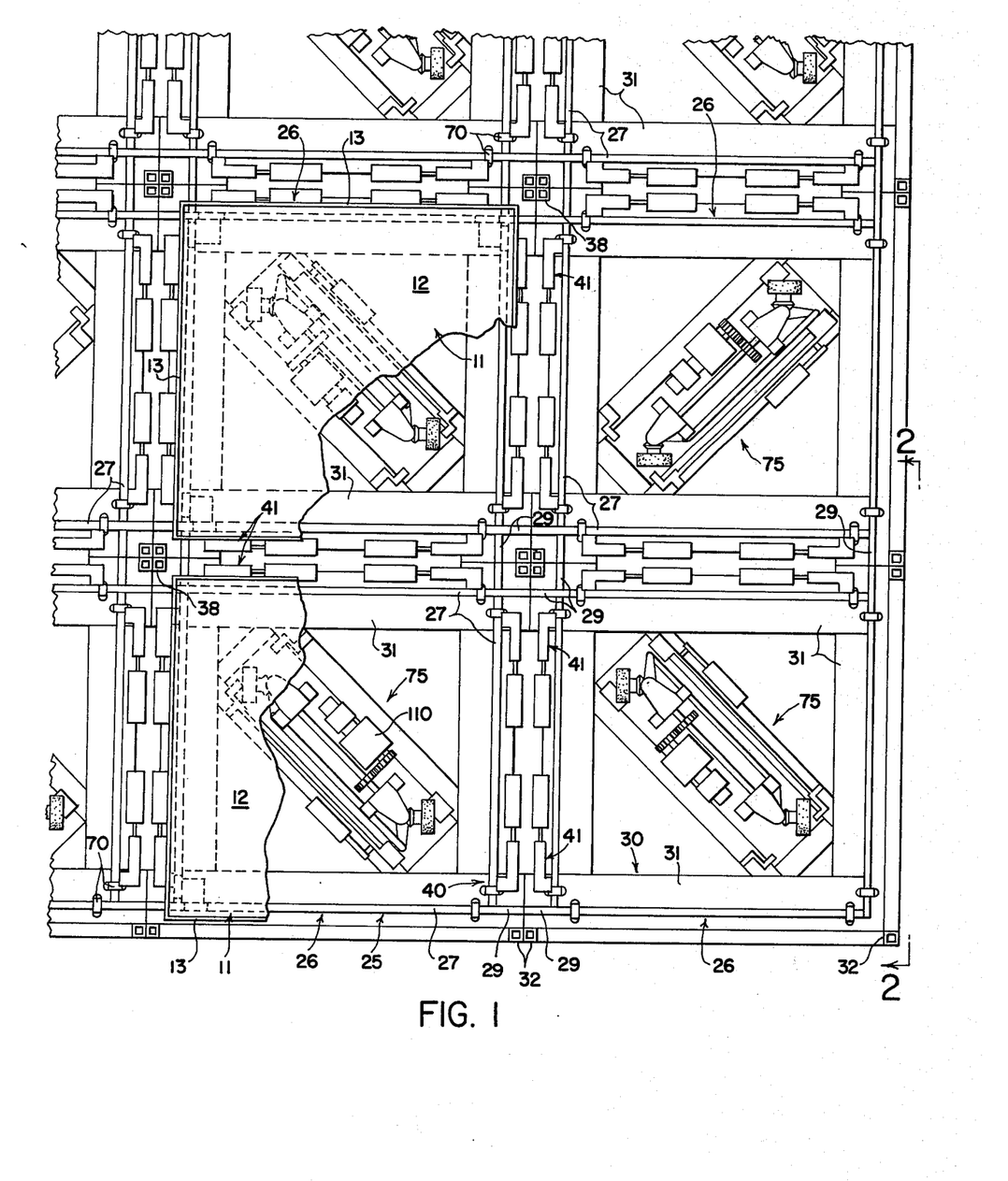
FIG. 1 is a fragmentary top plan view of exemplary material handling or transporter apparatus according to the concept of the present invention depicting a portion of one level of the apparatus having a plurality of compartments some of which have movable pallets positioned therein with portions broken away.
Figure 2:
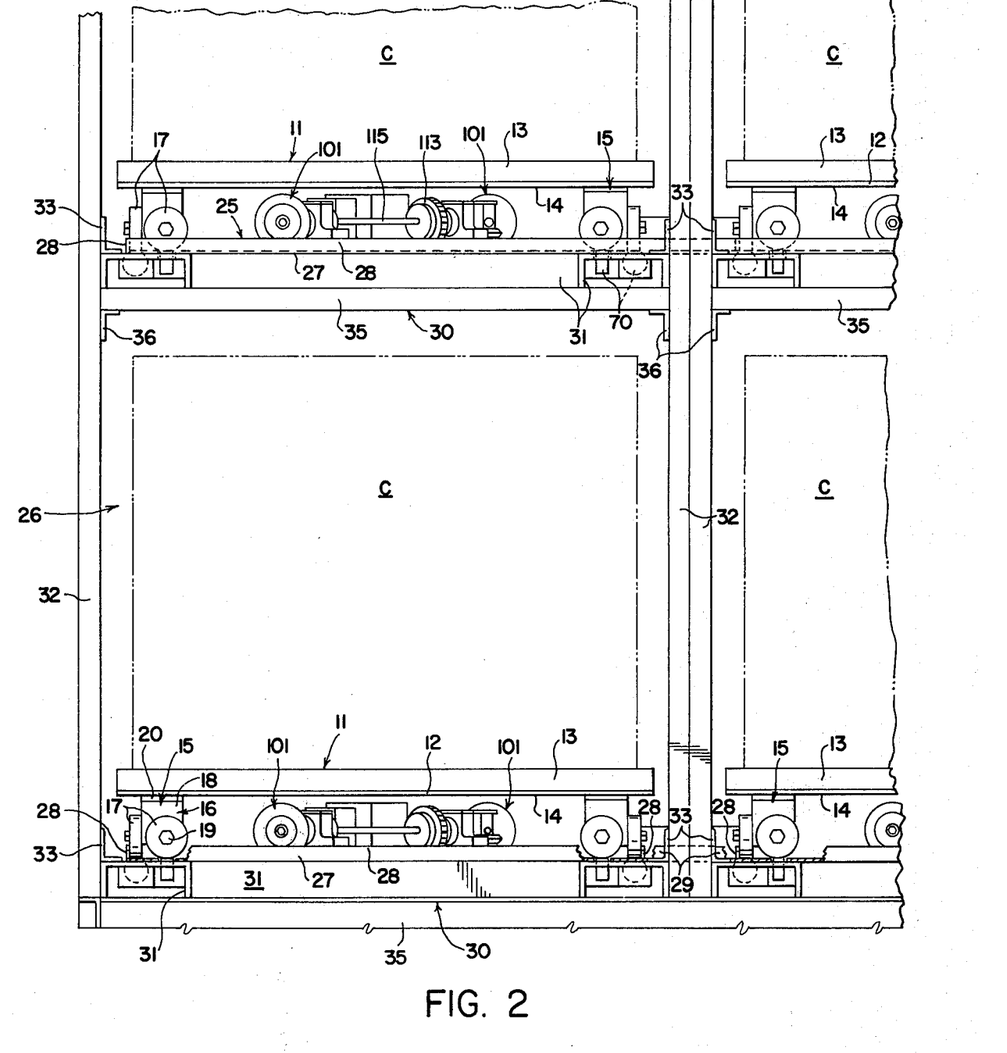
FIG. 2 is a fragmentary elevational view of the material handling apparatus of FIG. 1 showing compartments constituting a portion of two adjacent levels or stories of the apparatus.

Referring now to the drawings and particularly FIGS. 1 and 2 thereof, exemplary material handling or transporter apparatus according to the concepts of the present invention is generally indicated by the numeral 10. For purposes of example, the goods to be stored, retrieved, and transported by the material handling apparatus 10 are depicted as containers C (FIG. 2), which could serve to protect a single article or constrain a plurality of articles depending upon the size and configuration thereof. As seen, the containers C, when within the purview of the material handling apparatus 10, are supported by movable pallets, generally indicated by the numeral 11. It should be appreciated that one or more containers C may repose on any pallet 11 depending upon the relative sizes or that the articles may be positioned directly on the pallets 11, as for example in an instance where the material handling apparatus is designed as a parking deck and the articles are vehicles.

Figure 4:
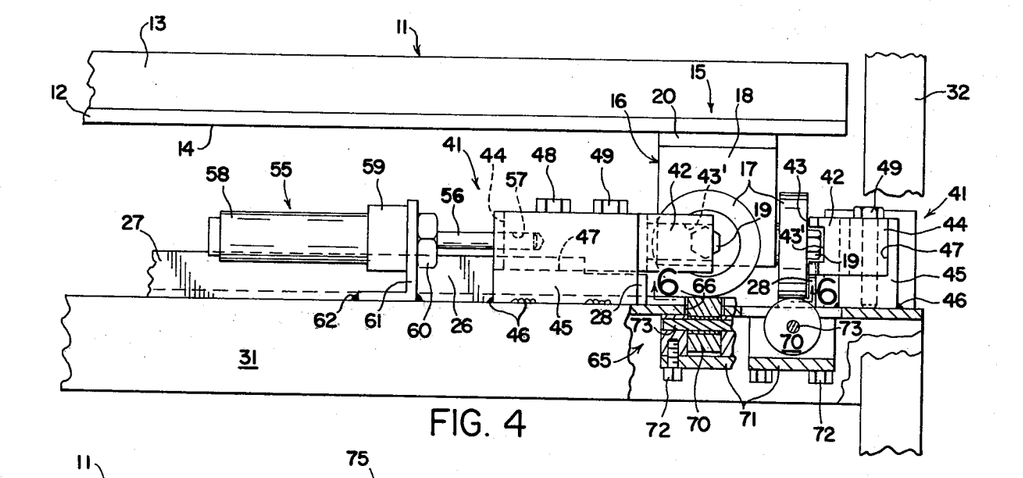
FIG. 4 is a fragmentary vertical sectional view taken substantially along the line 4—4 of FIG. 3 with a movable pallet positioned therein and showing particularly the relationship between the wheels of the movable pallet and rolls positioned in the tracks of the compartment to permit selective movement in one of two directions.

As best seen in FIGS. 2 and 4, the movable pallets 11 are advantageously of rather sturdy but noncomplex design such as to withstand repetitive loading and unloading forces while having a minimum of operating components which might be adversely affected by dirt, other foreign matter, or mistreatment which is particularly likely to be encountered in a loading and/or unloading area which may even be located exteriorly of the material handling apparatus. The pallets 11, which for a particular system may conveniently be identical, have a platform 12 which is the primary load supporting member for the containers C or other articles being handled by the system. In order to insure the stability of the container C or other articles on pallets 11 during the movement thereof, and particularly accelerating and decelerating phases, the platform 12 may be provided with upstanding side rails 13 of sufficient height to effect a lateral support or restraint function. For a purpose to be hereinafter detailed, the platform 12 preferably has a substantially smooth, generally unobstructed undersurface 14.

Figure 6:
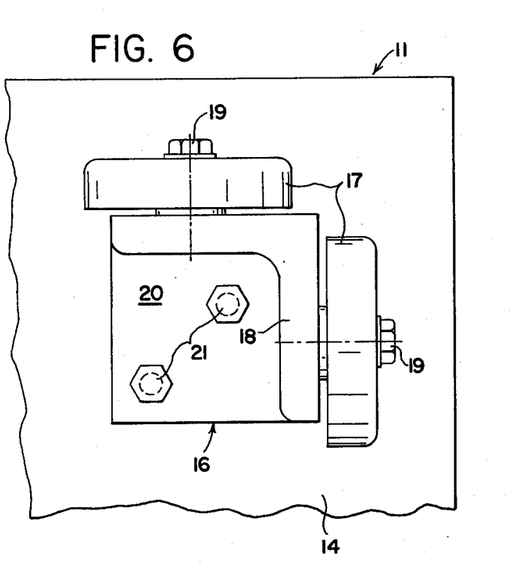
FIG. 6 is a fragmentary view of a portion of the lower surface of the pallet taken substantially along the line 6—6 of FIG. 4 and showing particularly the configuration and attachment of the pallet wheels.

As seen in FIGS. 2, 4 and 6, the movable pallets 11 are provided with running gear, generally indicated by the numeral 15. The running gear 15 for each pallet 11 consists of four sets of wheel mounting assemblies, generally indicated by the numeral 16, positioned preferably proximate each corner of the undersurface 14 of the platform 12. Each wheel mounting assembly 16 consists of two wheels 17 which are disposed in spaced fixed relation on perpendicular axes. Preferably, both wheels 17 of each wheel mounting assembly 16 are journal mounted on an angle bracket 18 by an axle member 19 which may take the form of a machine screw. The angle bracket 18 is in turn affixed to an attachment plate 20 which is rigidly attached to the undersurface 14 of the platform 12 as by machine screws 21. It is thus seen that the axles 19 of the wheels 17 are perpendicularly oriented and spaced from the undersurface 14 of platform 12 such that the lower surface of each set of wheels 17 of each of the four sets of wheel mounting assemblies 16 are presented in a downward coplanar position with a pallet 11 positioned as depicted in FIG. 2.

Figure 3:
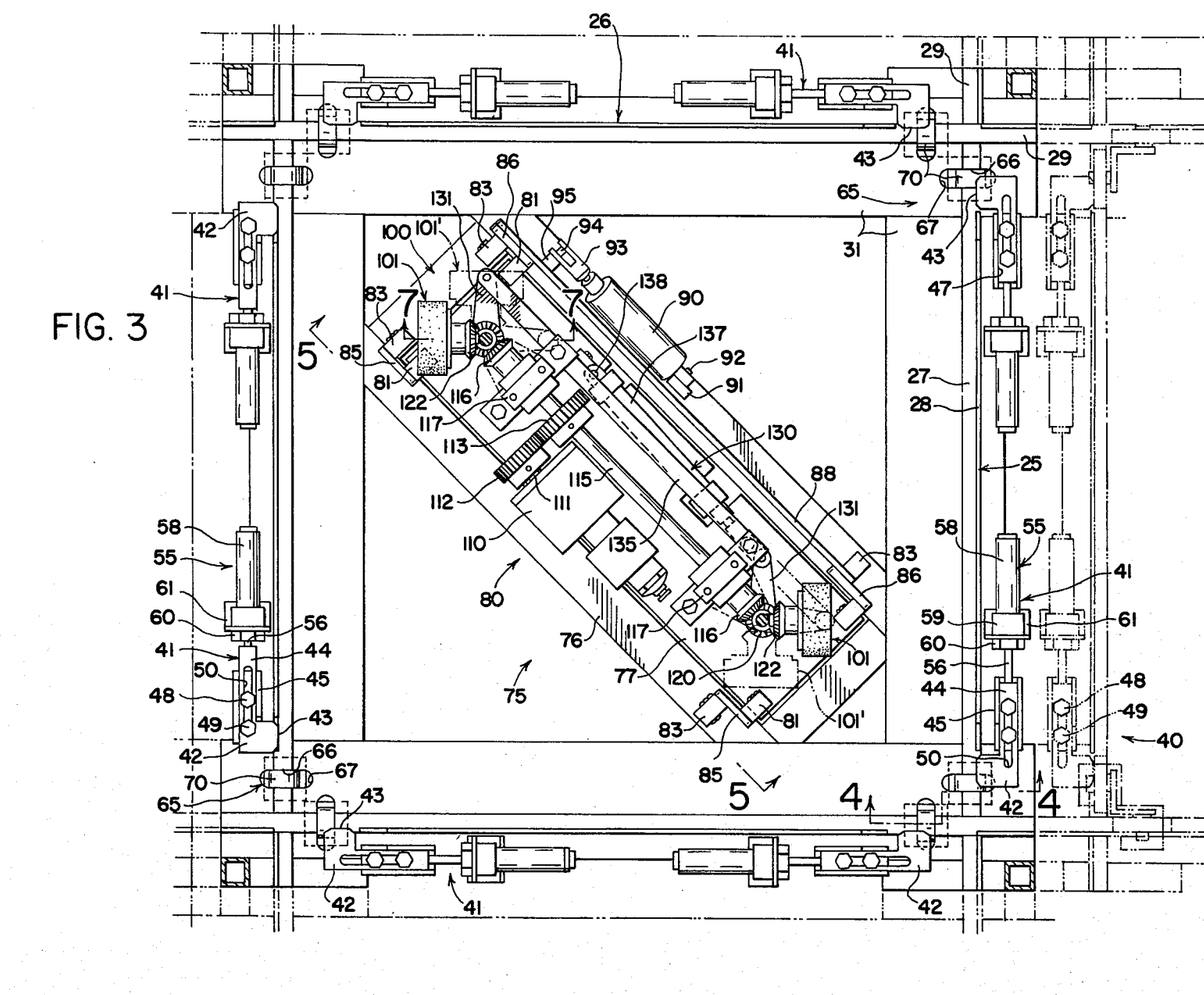
FIG. 3 is an enlarged fragmentary top plan view of a portion of the material handling apparatus of FIG. 1 depicting particularly the pallet drive mechanism and other operating components of a typical compartment.

The movable pallets 11 interact in such a manner with a track system, generally indicated by the numeral 25, as to provide selective movement in two mutually perpendicular directions. It should be understood that the referenced movement in two mutually perpendicular or otherwise angularly disposed directions actually contemplates possible motion in four different directions, namely, two opposite directions along each of two angularly offset, intersecting lines. As seen in FIG. 1, the track system 25 is arranged in such a manner as to form a plurality of compartments, generally indicated by the numeral 26, which may be substantially rectilinear and are preferably substantially square and sized comparable to the pallets 11, so that each compartment 26 is capable of accommodating any one of the identical pallets 11. The track system 25 may be composed of lengths of rails 27, on each side of each of the compartments 26, the rails 27 on opposite sides of any compartment being substantially parallel to provide mating rolling engagement with four identically directed wheels 17 of any of pallets 11, namely, two sets of coplanar wheels having the plane of each set paralleling the plane of the other set. Linear engagement between wheels 17 and mating rails 27 is positively maintained through a substantial portion of their extent by vertical guide portions 28 of the rails 27 (see FIGS. 2, 3, and 4) which are preferably located outwardly thereof for reasons which will become apparent based upon hereinafter discussed relationships with other components of the apparatus. As shown, the rails 27 and associated vertical guides 28 may be fabricated as an integral angle iron configuration. As best seen in FIGS. 1 and 3, rails 27 extending in directions in which there is an adjacent compartment have extension rails 29 interconnecting with similarly directed rails 27 of such adjacent compartments 26.

The track system 25 is structurally supported by suitable framing, generally indicated by the numeral 30, the configuration and characteristics of which would constitute matters of engineering design depending on a number of differing factors. For example, the framing 30 would differ depending upon the size and weight of the articles to be handled, the number and size of compartments on a level, and the presence or absence of multiple levels. As shown by way of example in FIGS. 1 and 2 each compartment 26 has peripheral U-shaped channel beams 31 upon which the rails 27 of track system 25 are attached and substantially rigidly supported. At the corners of compartments 26, the channel beams 31 may be attached to upright supports 32 as by angle irons 33 (see FIG. 2). In the event that a plurality of levels of compartments 26 are to be employed, the upright supports 32 may take the form of continuous columns extending upwardly through the various levels.

Additional support may be provided, depending upon loading requirements of a given installation, by providing cross beams 35 underlying the channel beams 31. The cross beams 35 may be attached to the upright supports 32 by angle irons 36 (FIG. 2). With the framing 30 hereinabove described, virtually any desired number of compartments 26 may be positioned on a level due to the modular construction which permits rapid joinder of the corner upright supports 32 to form pillars 38, as seen in FIG. 1. As shown, there are portions of what might be a nine compartment per level configuration; however, more or less compartments could be employed depending on space requirements of a particular application. Similarly, FIG. 2 depicts portions of a two level configuration, it being understood that any number of levels may be employed depending upon the number of compartments 26 required, the available square footage per level, and other related design considerations. It is to be understood that in multiple level configurations one or more compartments 26 would accommodate an elevator for moving pallets between levels, the elevator preferably equipped to constitute another compartment 26 for moving pallets about a level by the ingress and egress of pallets therefrom as will be appreciated by persons skilled in the art.

The position of pallets 11 within the compartments 26, as well as the selective ingress and egress of pallets 11 relative thereto, are controlled in part by a track interlock system, generally indicated by the numeral 40. As shown, the track interlock system 40 is composed of a plurality of identical lock assemblies, generally indicated by the numeral 41, which are located proximate the intersection of rails 27 in each of the compartments 26. As best seen in FIGS. 3 and 4, each lock assembly 41 has a stop block 42 which is selectively movable into and out of a position laterally adjacent a wheel 17 of the running gear 15 of a pallet 11 at a portion of rail 27 where the vertical guide portions 28 thereof are discontinuous. In the locked position depicted in FIG. 4 and all but the two lock assemblies at the left-hand side of FIG. 3, the stop blocks 42 overlie a substantial portion of the wheels 17 of a pallet 11 when positioned in a compartment 26 such as to preclude lateral displacement of the wheels 17 and in turn movement of a pallet 11. The stop blocks 42 preferably have guide faces 43 which are in lateral alignment with and serve as a continuation of the vertical guide portions 28 of the rails 27 with respect to a wheel 17 traveling along a rail 27. The guide faces 43 may be provided with slots 43' of sufficient extent to accommodate the projecting axle members 19 of wheels 17 such as to prevent upward displacement of the wheels 17 off the rails 27 when lock assemblies 41 are in the locked position. This vertical locking of pallets 11 relative to the rails 27 assumes particular significance in mobile, such as vehicular mounted, applications for material handling apparatus 10.

The stop blocks 42 have extending arms 44 which are mounted for selective reciprocating movement relative to support blocks 45 which are fixedly secured, as by welds 46, to the channel beams 31. The support blocks 45 have U-shaped channels 47 in which arms 44 of stop blocks 42 are slidably received. Arms 44 may be positively retained within the channels 47 and the extent of reciprocating movement established by a space pair of limit pins 48 and 49, which may take the form of cap screws, attached to the bottom of channels 47 and positioned within elongate through slots 50 in the arms 44 of stop blocks 42. The stop blocks 42 thus move relative to the support blocks 45 to the extent permitted by the extremities of through slot 50 coming into engagement with the limit pins 48, 49.

The linear movement of stop blocks 42 relative to support blocks 45 may conveniently be effected by air cylinders, generally indicated by the numeral 55, or other sources of reciprocating motion as would be evident to persons skilled in the art. As shown, the cylinders 55 have rods 56 which may conveniently be detachably affixed to the arms 44 of stop blocks 42, as by the threaded engagement depicted by the numeral 57 in FIG. 4. The cylinder 55 has a casing 58 with an enlarged shoulder 59 and is threaded to receive a nut 60 for clamping engagement to a cylinder holding bracket 61. The cylinder holding bracket 61 is fixed, as by welds 62 in FIG. 4, to a channel beam 31, such that the motion of cylinder rods 56 is transmitted to the arms 44 of the stop blocks 42. Thus, the ingress and egress of fluids to the cylinders 55 through conduits (not shown) in a conventional manner effects the requisite reciprocating movement of the stop blocks 42. With an individual cylinder for each stop block 42, the various stop blocks 42 can be controlled for independent, simultaneous, or sequential operation as may be required or desired for a particular installation.

The aforementioned movement of the pallets 11 in mutually perpendicular directions on the track system 25 is made possible by bidirectional interchange sections, generally indicated by the numeral 65, appropriately positioned in the rails 27. The bidirectional interchange sections 65 are located in the track system 25 in each of the compartments 26 in such a manner as to repose directly below or underlie each of the wheels 17 of a pallet 11 centered in the compartment 26. When so positioned, a pallet 11 can be moved, as will be hereinafter seen, in either of mutually perpendicular directions depending upon the setting of the lock assemblies 41 of track interlock system 40 associated with a particular compartment.

Each of the bidirectional interchange sections 65 has an elongate slot 66 formed in both the rails 27 and underlying channel beams 31 at a position directly below the wheels 17 of a pallet centered in a compartment 26. The slots 66 have their longitudinal dimension oriented transversely of the rails 27 and may be conveniently made, as shown, extending the width of the rails 27 and having generally oblate end portions 67 as best seen in FIG. 3. Reposing within each elongate slot 66 is a roller 70 which is supported from beneath rails 27 and channel beams 31 by a housing 71 which may be of generally U-shaped configuration as seen in FIG. 4. The housing may be conveniently attached to the underside of channel beam 31 by cap screws 72 or other comparable fastening devices. The sides of U-shaped housing 71 support a shaft 73 extending therebetween which serves as an axle for freely rotatably mounting the roller 70, the roller 70 being thus securely held by housing 71 and shaft 73 in a position hereinafter detailed.

In order to provide substantial continuity of the rails 27 in a direction longitudinally thereof, the elongate slot 66 is preferably of a width which only minimally exceeds the width of roller 70, i.e., to the extent necessary to provide rotational clearance for roller 70. In addition, the shaft 73 is also preferably positioned below and substantially in alignment with the center of the axial dimension of wheel 17, such that the tangential engagement between the periphery of roller 70 is located substantially centrally of the running surface of wheel 17. Thus, a wheel 17, as can be seen in the end elevation portion of FIG. 4, progressing along a rail 27 has a substantially uninterrupted path along the top tangential point of contact of roller 70. In addition, the rollers 70 are positioned longitudinally of rails 27 in such a manner that when a pallet is centered in a compartment 26, the tangential point of contact of wheel 17 lies substantially centrally of the axial extent of roller 70 in this position, as best seen in the right-hand side elevation of a wheel 17 depicted in FIG. 4.

Thus, were a pallet 11 to be moved toward or away from a viewer of FIG. 4, the wheel 17 shown in side elevation would move off the roller 70 thereunder by rotating the roller 70 about shaft 73 and assume a freely suspended no-load condition until comparably positioned rollers 70 are engaged in an adjacent compartment 26 (see FIGS. 3 and 1). Simultaneously, the wheel 17 shown in end elevation in FIG. 4, would move along its supporting roller 70 and smoothly onto and along the aligned rail 27, thereby becoming the load supporting wheel for the depicted corner of a pallet 11. Comparable transitions would take place at each of the four corners of a pallet 11 such that the directionally aligned wheels 17 at each corner of a pallet 11 would assume the load supporting functions of pallet 11.

When moving in any direction to an adjacent compartment 26, it is to be noted that the leading non-load supporting wheels 17 initially depart or pass off a supporting roller 70, assume a freely suspended condition, pass over the top of the proximate rollers 70 of the adjacent compartment, are freely suspended in traversing the compartment, and finally position themselves atop rollers 70 on the remote side of the compartment when the pallet 11 is centered in an adjacent compartment 26. The trailing non-load supporting wheels 17 of any pallet 11 initially depart or pass off of supporting rollers 70, assume a freely suspended condition in traversing the compartment, move atop and pass over rollers 70 on which the leading non-load supporting wheels initially reposed, and finally move across to repose atop rollers 70 on the proximate side of the adjacent compartment. The movement between any adjacent compartments depicted in FIG. 1 thus entails for what are to become the non-load supporting wheels 17 by virtue of the direction of movement the transfer off a roller 70 onto and off of an intermediately positioned roller 70 and onto a further roller constituting the final position. It is to be noted that the lateral traverse of these non-load supporting wheels is otherwise unobstructed, the wheels being spaced from the underlying channel beams 31 a distance equal to the thickness of rails 27 due to the downward coplanar positioning of the complementary load carrying wheels 17 at each corner of a pallet 11.

In the event movement of the pallet depicted in FIG. 4 to the right or left were desired, the operation of the aforedescribed wheels would be essentially reversed subsequent to effecting appropriate settings of the track interlock system 40. In such instance, the wheels 17 depicted in FIG. 4 would move such that the wheel 17 shown in side elevation would move along its supporting roller 70 and onto and along the aligned rail 27 in the desired direction thereby becoming the load supporting wheel for the depicted corner of the pallet 11. At the same time, the wheel 17 shown in end elevation in FIG. 4 would move off the roller 70 thereunder by rotating the roller about its shaft 73 and assume a freely suspended no-load condition until it passes across an intermediate roll and moves atop a comparably positioned roller 70 in an adjacent compartment 26. It can thus be seen that freedom of movement in two directions is equally possible for a pallet 11 centered in any compartment 26 on the bidirectional interchange sections 65.

Although the aforedescribed use of rollers 70 mounted for selective rotation under wheels 17 is deemed to be an optimum configuration permitting the desired bidirectional movement hereinabove described, it is possible that somewhat different configurations might be employed at least in instances where relatively light pallet loading conditions are to be encountered. For example, a cylinder configuration comparable to the rollers 70 might provide sufficient reduction of friction or drag for the lateral movement of wheels thereacross without critical damage to wheels 17 or the wheel mounting configurations. Other configurations providing a substantially continuous linear path and friction reducing characteristics during lateral movement might be envisaged by persons skilled in the art. It is, however, deemed preferable to employ the rotating roller configuration described above in conjunction with substantial pallet loading configurations or in instances where differing loading conditions are intermittently encountered.

The pallets 11 may be moved between the various compartments 26 as hereinabove described by any of a number of known propulsion systems; however, the novel pallet drive system, generally indicated by the numeral 75, is believed to be particularly advantageous for use in conjunction with other components of the material handling system 10 of the present invention and perhaps otherwise advantageous in conjunction with systems having common design characteristics to some extent. The pallet drive systems 75 associated with each of the compartments 26 are identical except for mounting orientations indicated hereinafter which may be advantageously varied due to the position of a particular compartment 26 relative to other adjacent compartments of the system.

Figure 5:
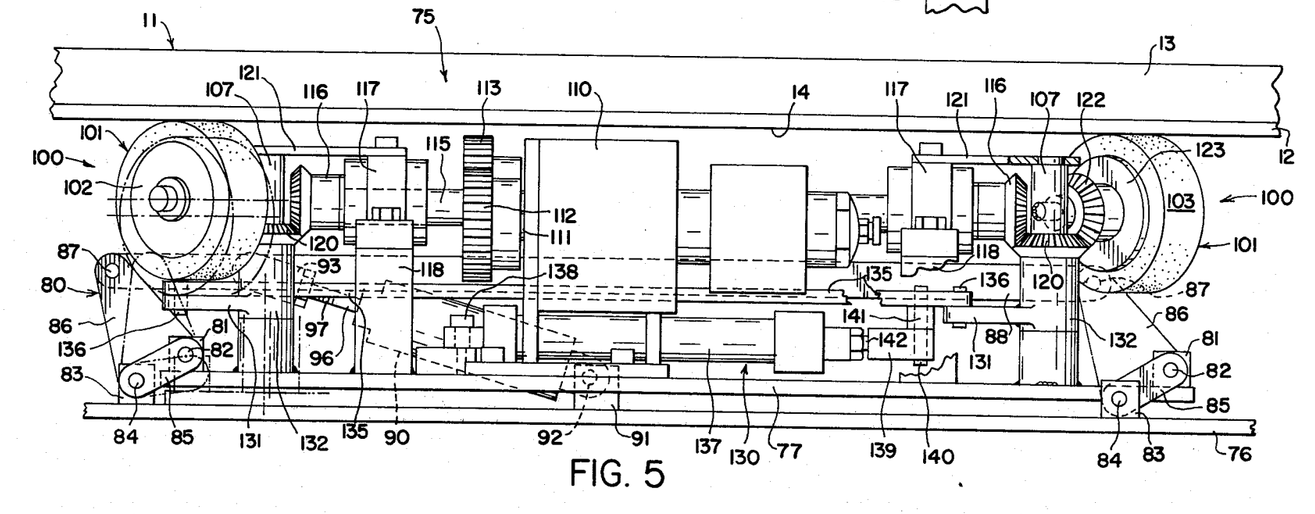
FIG. 5 is an enlarged sectional view taken substantially along the line 5—5 of FIG. 3 and showing details of the drive mechanism for the movable pallets.

As best seen in FIGS. 3 and 5, the pallet drive systems 75 are positioned generally diagonally of each compartment 26. The pallet drive systems 75 have a generally rectangular frame 76 which may be conveniently anchored to the channel beams 31. The frame 76 peripherally surrounds a platform 77 on which the remainder of the components of pallet drive system 75 are mounted.

The platform 77 of pallet drive system 75 is mounted for controlled vertical movement relative to the frame 76 by virtue of a platform lift assembly, generally indicated by the numeral 80. Each of the four corners of platform 77 carry rectangular bosses 81 which mount pins 82 and rectangular bosses 83 on the frame 76 which mount pins 84. The pins 82 and 84 are connected by elongate auxiliary links 85 on one side of the platform 77 and by triangular lift links 86 on the other side thereof. The upstanding portions of triangular lift links 86 carry pins 87 to which a control link 88 is attached to effect equal angular movement of the triangular lift links 86. Motion of control link 88 generally longitudinally thereof is effected by a drive cylinder 90. As shown, one end of the cylinder 90 is pivotally mounted to a boss 91 attached to the frame 76 by a bolt 92 and the other end of cylinder 90 carries a clevis 93 pivotally mounted on a shaft 94 supported by an annular boss 95 on control link 88. It can thus be seen that fluid actuation of the cylinder 90 imparts motion to control link 88 such that the triangular lift links 86 and the auxiliary lift links 85 move from the solid to the chain line depictions on the left-hand side of FIG. 5, thus effecting a component of vertical movement of the platform 77 relative to the frame 76. The clevis 93 may be adapted for variable positioning along the rod 96 of drive cylinder 90 by virtue of engagement with threads 97 therealong to permit selective adjustment of the extent of vertical movement of the platform 77 relative to the frame 76.

The interengagement between the pallets 11 and the pallet drive systems 75 is effected by a drive wheel assembly, generally indicated by the numeral 100. As shown, the drive wheel assembly 100 has at least one and preferably two spaced drive wheels, generally indicated by the numeral 101, in each compartment 26. Due to the diagonal positioning of pallet drive systems 75 relative to compartments 26 and the proximity of adjacent compartments, at least one of the wheels 101 engages a pallet 11 moving between compartments 26 at all times to maintain positive control thereof. In addition, this arrangement of wheels 101 advantageously provides for engagement of the pallets 11 by two of the wheels 101, either within a single compartment 26 or one wheel 101 located in each of two adjacent compartments 26, during a substantial portion of the travel of a pallet 11 between any two compartments 26. Further, both wheels 101 within a compartment 26 engage a pallet 11 moving between two adjacent compartments during a substantial portion of the critical acceleration and deceleration phases of pallet travel, thereby insuring the maintenance of positive control of pallets 11 at all times during the travel thereof. Further, the positioning of drive wheels 101 is such that there is no interference with the running gear 15 of the otherwise unobstructed undersurface 14 of pallets 11.

Figure 7:
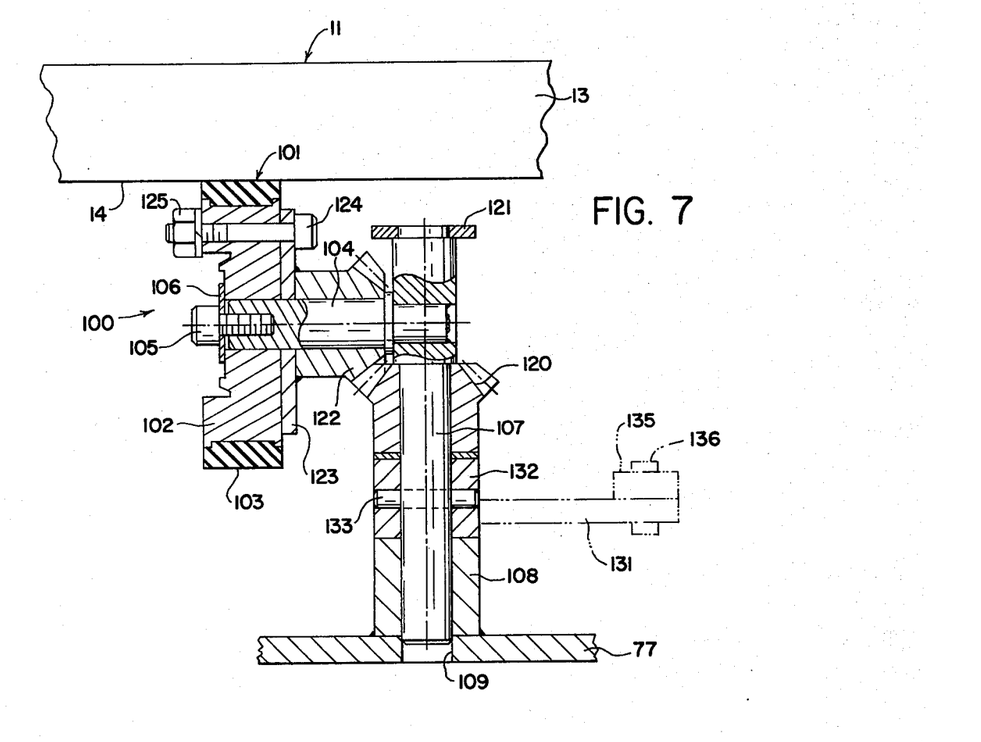
FIG. 7 is a fragmentary sectional view taken substantially along line 7—7 of FIG. 3 and depicting details of a drive wheel of the pallet drive system and the mounting configuration therefor.

As best seen in FIGS. 5 and 7, each of the drive wheels 101 has a wheel disk 102 on which a tread 103 is mounted circumferentially radially outwardly thereon. The tread 103 is composed of a material and may be outwardly configured in such a manner as to establish substantially non-slipping engagement with the undersurface 14 of a pallet 11 when in contact therewith (see FIG. 5). It has been found that a molded polyurethane tread 103 provides good traction characteristics with a pallet 11 having a steel or other metallic undersurface 14. It is to be appreciated that various elastomers or other materials may be employed for the treads 103 depending upon the material and surface characteristics of the undersurface 14 of pallets 11. In this connection, the hereinabove described adjustment of the extent of vertical movement of platform 77 relative to the frame 76 should be such that a significant normal force is established between undersurface 14 and the tread 103 to provide positive drive without vertical upward displacement of the entire pallet 11. The double parallelogram linkage formed by the lift links 85 and 86 maintains the platform 77 parallel to the undersurface 14 of pallet 11, such that wheels 101, mounted equal distances from platform 77 are substantially equally loaded when engaging a pallet 11.

The wheel disk 102 is freely rotatably mounted on an axle 104 and axially outwardly fixed thereon, as by a cap screw 105 and underlying retaining washer 106. The axle 104 is fixed in a position paralleling platform 77 on an upstanding shaft 107, as by a press fit seen in FIG. 7. The upstanding shaft 107 is maintained in position by a support boss 108 which is attached to the platform 77. If desired, the shaft 107 may extend into a bore 109 in platform 77 for additional support.

Referring now to FIGS. 3 and 5, the wheels 101 of drive wheel assembly 100 are selectively powered by an air motor 110 or other rotary power source. Although an air motor 110 might be used to drive each of the two wheels 101 in each compartment 26, a single air motor 110 in each compartment 26 can be coupled with a suitable drive train configuration to power the two wheels 101 in each compartment 26. As shown, each air motor 110 has an output shaft 111 which carries an attached spur gear 112 that is mounted for mating engagement with a spur gear 113 on a through drive shaft 115 extending essentially the distance between the shafts 107 located near each of the longitudinal extremities of platform 77. Each extremity of drive shaft 115 carries a shaft bevel gear 116 constituting one element of an epicyclic type gear train. The drive shaft 115 may be conveniently supported in position for free rotation by pillow blocks 117 mounted proximate each of the bevel gears 116 on support stands 118 which are attached to the platform 77.

Referring further to FIGS. 3 and 5 and additionally to FIG. 7 of the drawings, the other members of the epicyclic type gear trains besides the shaft bevel gears 116 may be seen as operatively related to the drive wheels 101. Matingly engaging the shaft bevel gears 116 are idler bevel gears 120 mounted for free rotation on the upstanding shafts 107. In order to assure stable positioning of the shafts 107, the extremities opposite the supporting bosses 108 may be retained in supporting brackets 121 attached to pillow blocks 117. The idler bevel gears 120, in addition to their engagement with shaft bevel gears 116, also matingly engage drive wheel bevel gears 122 which are carried on axles 104 between the wheel disks 102 and the upstanding shafts 107. The drive wheel bevel gears 122 are attached to drive wheel backing plates 123 to which the wheel disks 102 are nonrotatably affixed as by a plurality of cap screws 124 and mating nuts 125 extending through appropriate bores in backing plates 123 and wheel disks 102. Thus, the speed and duration of rotation of the drive wheels 101 of any compartment 26 are equivalent and directly controlled by an air motor 110 through the gear linkages hereinabove described. Although it may be necessary in some instances to provide for rotation of drive wheels 101 in both directions the position of some compartments 26 relative to the other compartments of a system may make two directional rotation unnecessary. For example, the diagonal positioning of the pallet drive system 75 in the lower right-hand corner of FIG. 1 would require only one direction of rotation to control a pallet's ingress from the left side and egress from the top thereof, or vice versa, whereas positioning along the other diagonal would require rotation in two directions to effect the same ingress and egress.

The pallet drive system 75 also has a drive direction control assembly, generally indicated by the numeral 130, providing selective movement of pallets 11 in one of the two mutually perpendicular directions permitted by rails 27 in the compartments 26 by virtue of cooperative interaction with platform lift assembly 80 and drive wheel assembly 100. As shown in FIG. 3, this positioning or orienting of drive wheels 101 is from the depicted solid-line position paralleling one set of parallel rails 27 to the chain-line position 101' wherein drive wheels 101 parallel the opposite pair of parallel rails 27 or the reverse movement. This selective angular displacement of drive wheels 101 through substantially 90° is effected by the drive direction control assembly 130. The requisite 90° rotation of the upstanding shafts 107 to which the axles 104 of drive wheels 101 are attached is effected by direction control arms 131 (FIGS. 3 and 5) which are rigidly attached to collars 132 circumposed about upstanding shafts 107 and interposed therealong between support bosses 108 and idler bevel gears 120 (FIGS. 5 and 7). The collar 132 is nonrotatably attached to upstanding shaft 107 by a pin 133 (FIG. 7) such that shaft 107 rotates with direction control arms 131. Thus, angular movement of direction control arms 131 effects rotation of upstanding shaft 107 such that axle 104 is angularly displaced by drive wheel bevel gears 122 rotating along idler bevel gears 120 of the epicyclic gear trains. The direction control arms 131 associated with each of the drive wheels 101 of a compartment 26 are joined to effect equiangular motion at all times by a direction control link 135, the extremities of which are attached to direction control arms 131 as by pins 136.

The motion of direction control link 135 longitudinally thereof for purposes of effecting the specified angular motion of direction control arms 131 is effected by a direction control drive cylinder 137. As seen in FIGS. 3 and 5, one extremity of direction control drive cylinder 137 is attached as by a bolt 138 to the platform 77 and the other end of direction control cylinder 137 carries a clevis 139 pivotally mounted on a pin 140 supported by an annular boss 141 on direction control link 135. The clevis 139 may be adapted for variable positioning axially of rod 142 of direction control cylinder 137 as by threading engagement (not shown) to permit selective adjustment of the rotational travel of direction control arms 131 as effected by direction control link 135.

Operationally, the above-described pallet drive system 75 contemplates actuation of the drive direction control assembly 130 prior to actuation of the platform lift assembly 80 to move the drive wheel assembly 100 into engagement with the undersurface 14 of pallet 11 after effecting appropriate settings of the track interlock system, as hereinabove described. Then, the drive wheels 101 would be selectively powered by air motors 110 in the two compartments involved in the pallet movement to effect the requisite transfer from one compartment 26 to the selected adjacent compartment. It is possible with the components hereinabove provided that actuation of the drive direction control assembly 130 could follow the energizing of the platform lift assembly 80 such that the wheels 101 would be selectively adjusted to the requisite alignment within a compartment 26 while in engagement with the pallets 11. In addition, provision could be made to effectively bias platform lift assembly 80 to the upper position such that the drive wheel assembly 100 is maintained in contact with the pallets 11 at all times except when lowered by actuation of the platform lift assembly 80 for purposes of effecting actuation of drive direction control assembly 130 to alter the orientation of drive wheels 101.

Figure 8:
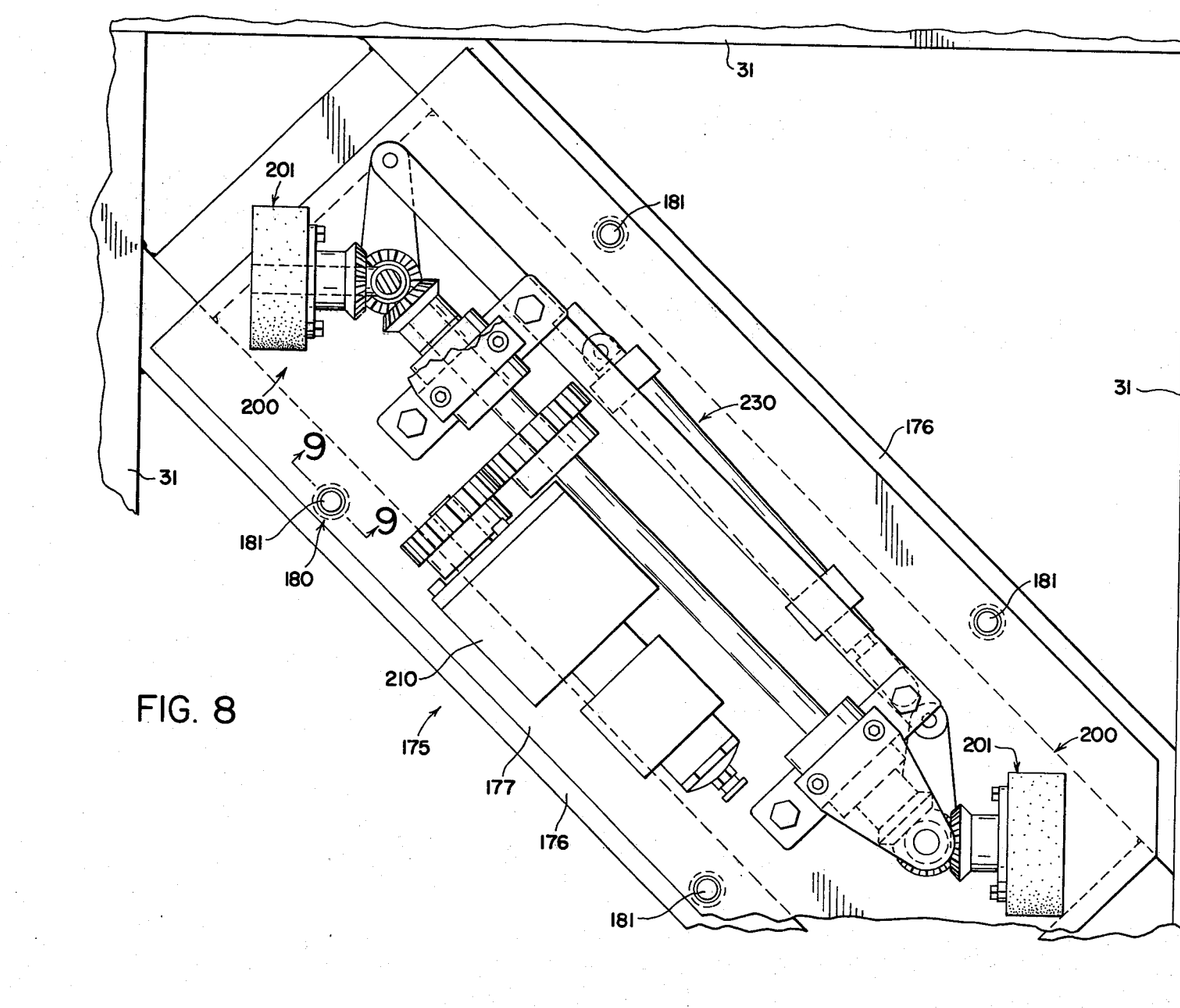
FIG. 8 is a top plan view similar to a portion of FIG. 3 depicting an alternate embodiment of a platform lift assembly of the pallet drive system according to the present invention.
Figure 9:
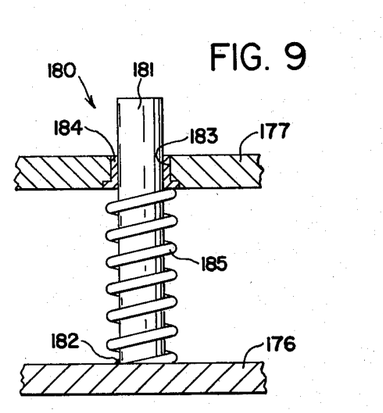
FIG. 9 is a fragmentary sectional view taken substantially along the line 9—9 of FIG. 8 and depicting the components effecting the mounting of the platform relative to the associated frame.

An alternate embodiment of the present invention depicted in FIGS. 8 and 9 demonstrates a variation of the present invention wherein the platform portion of the pallet drive system is permanently biased into the aforedescribed upper position such that the pallets 11 are positively engaged by the drive wheels at all times. This provides for continuous engagement between the drive wheels and a pallet positioned in any compartment to retain control thereover even in the event of a loss of source power, of either a pneumatic or electrical nature depending upon the selection of system components, to the system as a whole. Thus, a desirable control would be maintained with respect to all pallets at all times.

As seen particularly in FIG. 8, the alternate pallet drive system, generally indicated by the numeral 175, is except as hereinafter specified, generally configured in accordance with the pallet drive system 75. More particularly, the pallet drive system 175 has a rectangular frame 176 which may be identical to the rectangular frame 76 and similarly anchored to channel beams 31. The frame 176 peripherally surrounds a platform 177 which is identical to platform 77 except that in the instant embodiment platform 77 is preferably of greater lateral extent such as to substantially overlie a portion of the frame 176. The platform 177 seen in FIG. 9 carries a drive wheel assembly, generally indicated by the numeral 200, which is identical to drive wheel assembly 100 with spaced drive wheels, generally indicated by the numeral 201, which are identical to drive wheels 101. The drive wheels 201 are driven by an air motor 210 and associated gear train in a manner identical with that described in conjunction with air motor 110. Further, pallet drive system 175 has a drive direction control assembly, generally indicated by the numeral 230, which effects selective angular displacement of drive wheels 101 through substantially 90° in the manner described in conjunction with the description of drive direction control assembly 130.

The alternate pallet drive system 175 differs from the pallet drive system 75 primarily in that the platform lift assembly 80 of the first embodiment of the invention is eliminated in its entirety and a platform vertical positioning assembly, generally indicated by the numeral 180, is substituted therefor. Referring now to FIGS. 8 and 9 together, the platform vertical positioning assembly 180 contemplates the use of a plurality—preferably four—of alignment pins 181 positioned in spaced relation, two along each side of platform 177. As best seen in FIG. 9, the alignment pins 181 are rigidly attached to the platform 177 as by a weldment 182 and project upwardly through an aperture 183 in the platform 177. A bearing insert 184 may be provided in the aperture 183 of platform 177 for purposes of permitting repeated sliding motion between alignment pins 181 and platform 177 without undue wear. The position of platform 177 relative to frame 176 is established by a spring member 185 circumferentially disposed about alignment pin 181 and interposed between frame 176 and platform 177. The design configuration of spring member 185 is such that platform 177 is elevated to an extent that drive wheels 201 will engage the underside of an unloaded pallet 11 with a continuous bias producing sufficient normal force to effect the positive drive hereinabove described. The spring member 185 may also be advantageously designed in such a manner that substantial downward displacement of platform 177 is permissible without adversely affecting the operation of any of the system components. This capability is of particular significance in regard to pallets of substantial size carrying heavy loads which necessarily produce substantial deflection of the undersurface 14 of a pallet 11. In this respect, it has also been found that the design characteristics of spring member 185 can be established such that drive direction control assembly 230 may be selectively actuated despite the engagement of drive wheels 201 with a pallet 11.

An embodiment of the present invention and an alternate embodiment of one facet thereof have been described in detail by way of example in one exemplary environment. It will be apparent to those skilled in the art that the concepts hereof are applicable in an infinite variety of compartment layouts to effect an equal variety of pallet movements or sequences of movements. Equally apparent is the fact that the operational actuation of elements of the various assemblies and subassemblies may be manually or automatically controlled, as desired, depending upon the design, cost, and other requirements of a particular application of the concepts of the material handling apparatus of the present invention.

I claim:

1. Transporter apparatus for the controlled movement of goods comprising, two intersecting rail means, pallet means capable of supporting the goods, first wheel means mounted on said pallet means for engaging one of said intersecting rail means, second wheel means mounted on said pallet means for engaging the other of said intersecting rail means, and directional interchange means in each of said intersecting rail means contacting said first and second wheel means to permit movement of said pallet means in two angular directions therefrom, and drive means engaging said pallet means for selectively propelling said pallet means in either of the two angular directions, said drive means including two drive wheels which engage said pallet means disposed generally diagonally of said pallet means when positioned on said direction interchange means.

2. Transporter apparatus for the controlled movement of goods comprising, two intersecting rail means, pallet means capable of supporting the goods, first wheel means mounted on said pallet means for engaging one of said intersecting rail means, second wheel means mounted on said pallet means for engaging the other of said intersecting rail means, and directional interchange means in each of said intersecting rail means contacting said first and second wheel means to permit movement of said pallet means in two angular directions therefrom, and drive means engaging said pallet means for selectively propelling said pallet means in either of the two angular directions, said drive means including wheel means and lift means for selectively urging said wheel means into engagement with said pallet means, said lift means including a plurality of link means angularly movable to carry said wheel means into and out of engagement with said pallet means.

3. Transporter apparatus for the controlled movement of goods comprising, two intersecting rail means, pallet means capable of supporting the goods, first wheel means mounted on said pallet means for engaging one of said intersecting rail means, second wheel means mounted on said pallet means for engaging the other of said intersecting rail means, and directional interchange means in each of said intersecting rail means contacting said first and second wheel means to permit movement of said pallet means in two angular directions therefrom, and drive means engaging said pallet means for selectively propelling said pallet means in either of the two angular directions, a plurality of said rail means forming a plurality of compartments and said drive means including a plurality of drive wheels, at least one drive wheel engaging said pallet means at all times during travel between adjacent compartments.

4. Apparatus according to claim 3, wherein at least two of said drive wheels engage said pallet means at substantially all times during travel between adjacent compartments.

5. Transporter apparatus for the controlled movement of goods comprising, at least two pairs of intersecting rail means, pallet means capable of supporting the goods, first wheel means fixedly mounted on said pallet means for rolling on one of said pairs of intersecting rail means, second wheel means fixedly mounted on said pallet means for rolling on another of said pairs of intersecting rail means, interchange means in each of said rail means permitting movement of said first and second wheel means in two angular directions therefrom, said first wheel means rollably supported said pallet means upon movement in one direction and said second wheel means rollably supporting said pallet means upon movement in the other direction, and interlock means disposed proximate the intersections of said rail means.

6. Apparatus according to claim 5, wherein said interlock means include blocking means movable into and out of a position adjacent said wheel means when positioned on said interchange means to selectively preclude or permit movement of said wheel means laterally of said rail means.

7. Apparatus according to claim 6, wherein said blocking means have guide face means providing alignment for said wheel means moving longitudinally of said rail means.

8. Apparatus according to claim 7, wherein said guide face means of said blocking means has slot means and said wheel means have projecting axle means extending into said slot means to prevent displacement of said wheel means relative to said rail means.

9. Apparatus according to claim 8, wherein said blocking means have arms movable relative to fixed support blocks by cylinder means.

10. Apparatus according to claim 9, wherein limit pins in said support blocks engage a slot in said arms to establish the extent of reciprocating movement of said blocking means.

11. Drive apparatus for providing selective multidirectional travel of a pallet carrying goods on a rail system comprising, platform means, drive wheel means mounted from said platform means, means for urging said wheel means into engagement with the pallet, and direction control means operable independent of said means for urging said wheel means into engagement with the pallet for selectively orienting said drive wheel means for travel of the pallet in one of a plurality of angular directions, said means for urging said wheel means into engagement with the pallet being lift means having a plurality of angularly movable link means powered by cylinder means for selectively bringing said wheel means into and out of engagement with the pallet.

12. Drive apparatus for providing selective multidirectional travel of a pallet carrying goods on a rail system comprising, platform means, drive wheel means having two drive wheels mounted from said platform means, means for urging said wheel means into engagement with the pallet, and direction control means operable independent of said means for urging said wheel means into engagement with the pallet for selectively orienting said drive wheel means for travel of the pallet in one of a plurality of angular directions, said direction control means selectively angularly rotating said drive wheels through an angle of approximately 90°, the rotation of said drive wheels being effected through an epicyclic gear train associated with a gear linkage means selectively directionally driving said drive wheels.

* * * * *